US009247085B1

(12) United States Patent
Chen et al.

(10) Patent No.: US 9,247,085 B1
(45) Date of Patent: Jan. 26, 2016

(54) WIRELESS SCANNER

(71) Applicant: Foxlink Image Technology Co., Ltd., New Taipei (TW)

(72) Inventors: Chi Wen Chen, New Taipei (TW);
Chun Yuan Sun, New Taipei (TW);
Chia Hsiang Wang, New Taipei (TW);
Yen Chi Wu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 14/590,309

(22) Filed: Jan. 6, 2015

(51) Int. Cl.
*H04N 1/04* (2006.01)
*H04N 1/00* (2006.01)

(52) U.S. Cl.
CPC ....... *H04N 1/00525* (2013.01); *H04N 1/00108* (2013.01)

(58) Field of Classification Search
CPC .................................................. H04N 1/00525
See application file for complete search history.

(56) References Cited

U.S. PATENT DOCUMENTS

| 4,793,812 | A | * | 12/1988 | Sussman et al. | ............... | 434/116 |
| 5,446,559 | A | * | 8/1995 | Birk | ............................. | B41J 3/36 347/109 |
| 5,497,150 | A | * | 3/1996 | Kimura et al. | ..................... | 341/1 |
| 5,687,007 | A | * | 11/1997 | Yamazaki | ................ | H04N 1/03 358/473 |
| 5,754,713 | A | * | 5/1998 | Deguchi et al. | ............... | 382/313 |
| 6,033,086 | A | * | 3/2000 | Bohn | ............................. | 362/235 |
| 6,064,779 | A | * | 5/2000 | Neukermans et al. | ........ | 382/313 |
| 6,081,630 | A | * | 6/2000 | Kaneko | ........................... | 382/313 |
| 6,097,507 | A | * | 8/2000 | Bohn | ............................. | 358/473 |
| 6,160,250 | A | * | 12/2000 | Miksch et al. | ............. | 250/208.1 |
| 8,056,805 | B2 | * | 11/2011 | Wolf, II | ......................... | 235/454 |
| 2011/0164292 | A1 | * | 7/2011 | Wolf | ..................... | G06F 1/1626 358/473 |

FOREIGN PATENT DOCUMENTS

JP        3195094 U   *  12/2014

* cited by examiner

*Primary Examiner* — Cheukfan Lee
(74) *Attorney, Agent, or Firm* — Lin & Associates Intellectual Property, Inc.

(57) ABSTRACT

A wireless scanner includes an optical scanning assembly which includes a housing, a light source circuit board, a reflective member and an image capture module. The housing has a bottom wall defining a window, a high end wall, a short end wall and two side walls. Two edges of the two side walls connecting with the top wall and the short end wall are defined as slopes. The light source circuit board is mounted to one of the two side walls and inclined upward and outward. The reflective member is mounted to the slopes and receives light from the light source circuit board to reflect it uniformly on the window. The image capture module is mounted to the high end wall for receiving light which is from an original in the window and reflected by the reflective member and then transmitting it to a Printed Circuit Board assembly.

6 Claims, 4 Drawing Sheets

WIRELESS SCANNER

BACKGROUND OF THE INVENTION

1. Field of the Invention

The present invention relates to a scanner, and more particularly to a wireless scanner.

2. the Related Art

In computing, an image scanner, which is often abbreviated as a scanner, is a device that optically scans an original, such as an image, printed text, handwriting and an object, and converts it to a digital image. Commonly used in offices are variations of the desktop flatbed scanner where the original is placed on a glass window for scanning A disadvantage of the desktop flatbed scanners is that it requires a lot of desktop space that is undesirable. For miniaturization, a hand-held scanner adapted for being moved by hand has become attractive. However, the principle of the hand-held scanner also limits that it must be of elongated rectangular shape that is inconvenient to carry. For portability, a mouse scanner equipped with two-dimensional array of optical sensing components and position sensors emerged to sharply reduce the length of the foregoing scanner. However, it has affected the appearance and size of the mouse.

In order to solve problems of the mouse scanner, a wireless scanner is provided and includes an optical scanning assembly. The optical scanning assembly includes an imaging surface for holding the original, a plurality of light sources arranged around a perimeter of the imaging surface for illuminating the imaging surface and the original, a reflective member positioned opposite to the imaging surface for receiving and reflecting light from the light sources and reflected from the original on the imaging surface, and an imaging member disposed adjacent to an edge of the imaging surface to receive the reflected light from the reflective member.

However, the light sources are arranged on the same level with the imaging surface. When the reflective member receives and reflects the light, some highlights will be produced by the light sources. Furthermore, the brightness on the imaging surface will be reduced and the light on the imaging surface is non-uniform, so that could result in a poor scan effect.

SUMMARY OF THE INVENTION

Accordingly, an object of the present invention is to provide a wireless scanner. The wireless scanner includes a shell, a Printed Circuit Board assembly and an optical scanning assembly. The Printed Circuit Board assembly is disposed in the shell and controls all functions and operations of the wireless scanner. The optical scanning assembly is disposed in the shell. The optical scanning assembly includes a housing, a light source circuit board, a reflective member and an image capture module. The housing is of rectangular shape. The housing has a top wall, a bottom wall, a high end wall, a short end wall and two side walls. The high end wall and the short end wall are oppositely protruded upward on two ends of the bottom wall. A top of the short end wall is spaced below the top wall. Two edges of the two side walls which connect with the top wall and the top of the short end wall are defined as slopes. The bottom wall defines a rectangular window for scanning an original. Two long sides of the window are parallel to ones of the bottom wall. The light source circuit board is mounted to an outer side of one of the two side walls of the housing and electrically connected to the Printed Circuit Board assembly. The light source circuit board is inclined upward and outward relative to the one of the two side walls at a predetermined angle. An inner side of the light source circuit board is equipped with a plurality of light sources. The light sources are exposed through the one of the two side walls for illuminating the inside of the optical scanning assembly, the window and the original. The reflective member is mounted to the slopes of the housing and slantwise faces the window. The reflective member receives light from the light sources and reflects the light uniformly on the window. The image capture module is mounted to the high end wall of the housing and electrically connected to the Printed Circuit Board assembly. The reflective member slantwise faces the image capture module. The image capture module receives light which is from the original and reflected by the reflective member and then transmits it to the Printed Circuit Board assembly, where the Printed Circuit Board assembly converts the original to a digital image.

As described above, the reflective member of the optical scanning assembly is mounted to the slopes of the housing, the light source circuit board is mounted to the outer side of the one of the two side walls of the housing and inclined upward and outward relative to the one of the two side walls at a predetermined angle. So that the wireless scanner achieves a flat optical path configuration, and the illumination brightness is uniform on the window. Furthermore, the wireless scanner will have a small size and a good effect.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
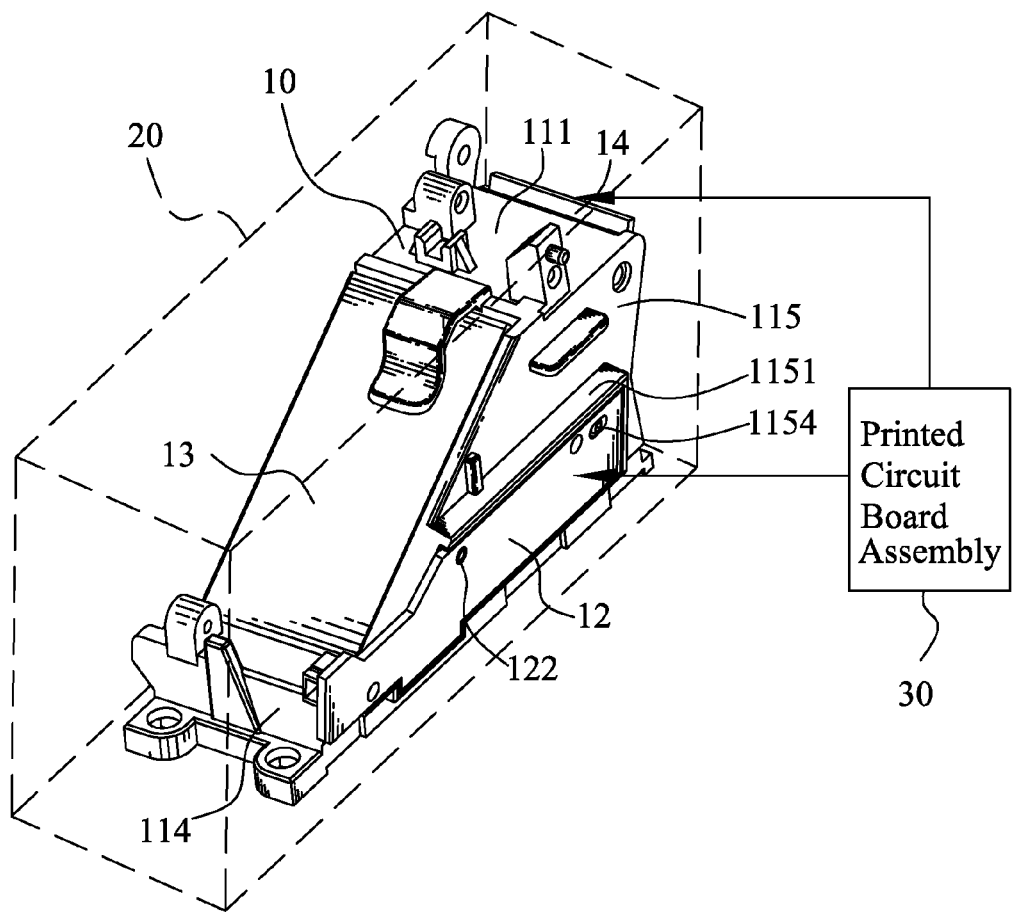
FIG. 1 is a perspective view of a wireless scanner according to an embodiment of the present invention.

Referring to FIG. 1, FIG. 2, FIG. 3 and FIG. 4, a wireless scanner according to an embodiment of the present invention is shown. The wireless scanner includes a shell 20, a Printed Circuit Board assembly 30 and an optical scanning assembly 10. The Printed Circuit Board assembly 30 is disposed in the shell 20 and controls all functions and operations of the wireless scanner. The optical scanning assembly 10 is disposed in the shell 20 and includes a housing 11, a light source circuit board 12, a reflective member 13 and an image capture module 14.

Figure 2:
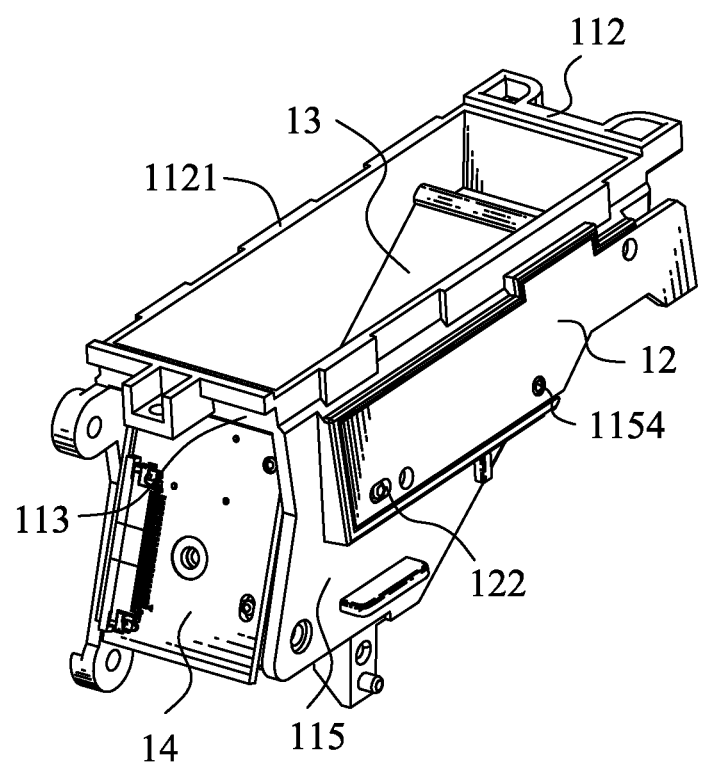
FIG. 2 is a perspective view of an optical scanning assembly of the wireless scanner shown in FIG. 1.
Figure 3:
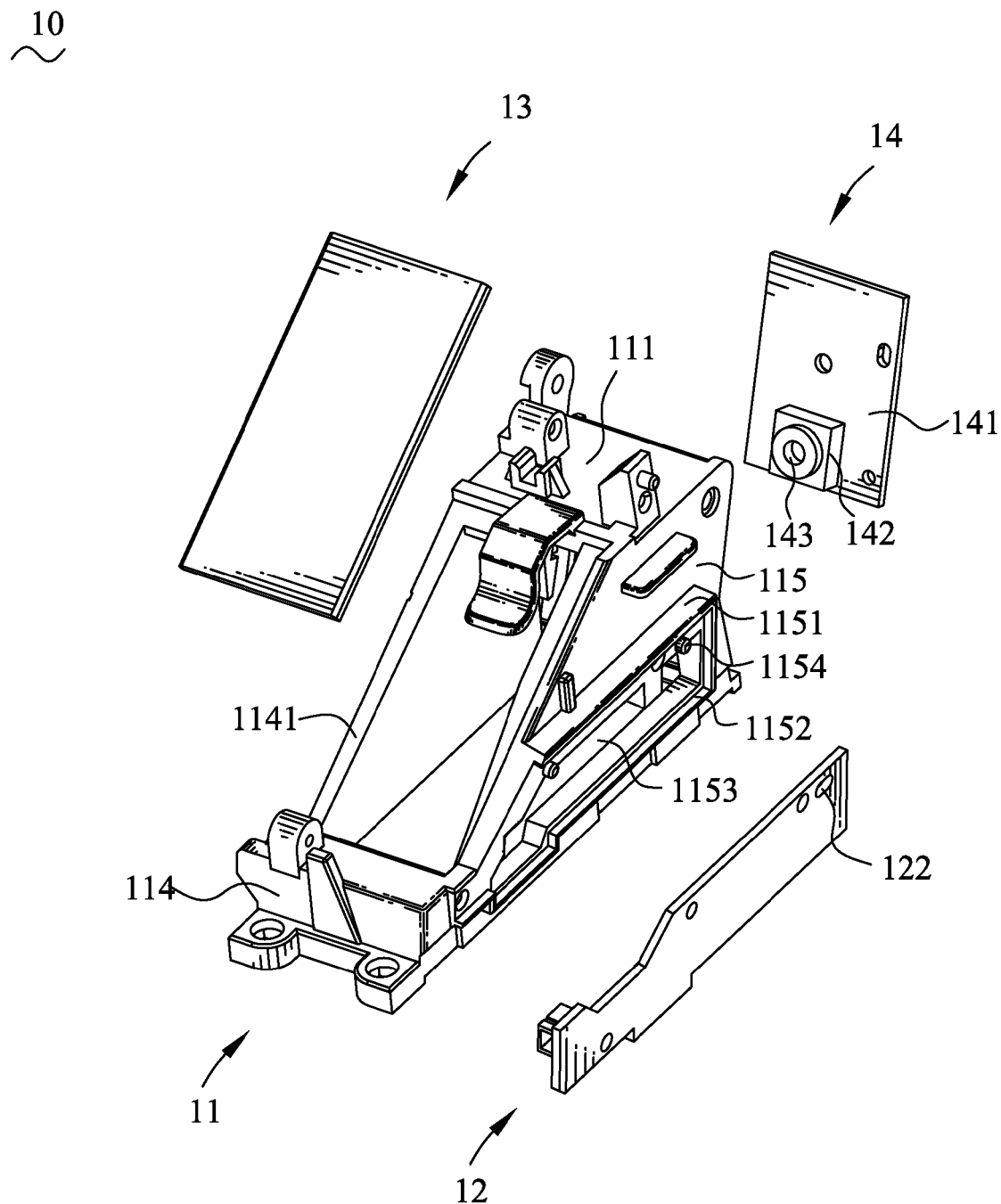
FIG. 3 is an exploded view of the optical scanning assembly of FIG. 2.
Figure 4:
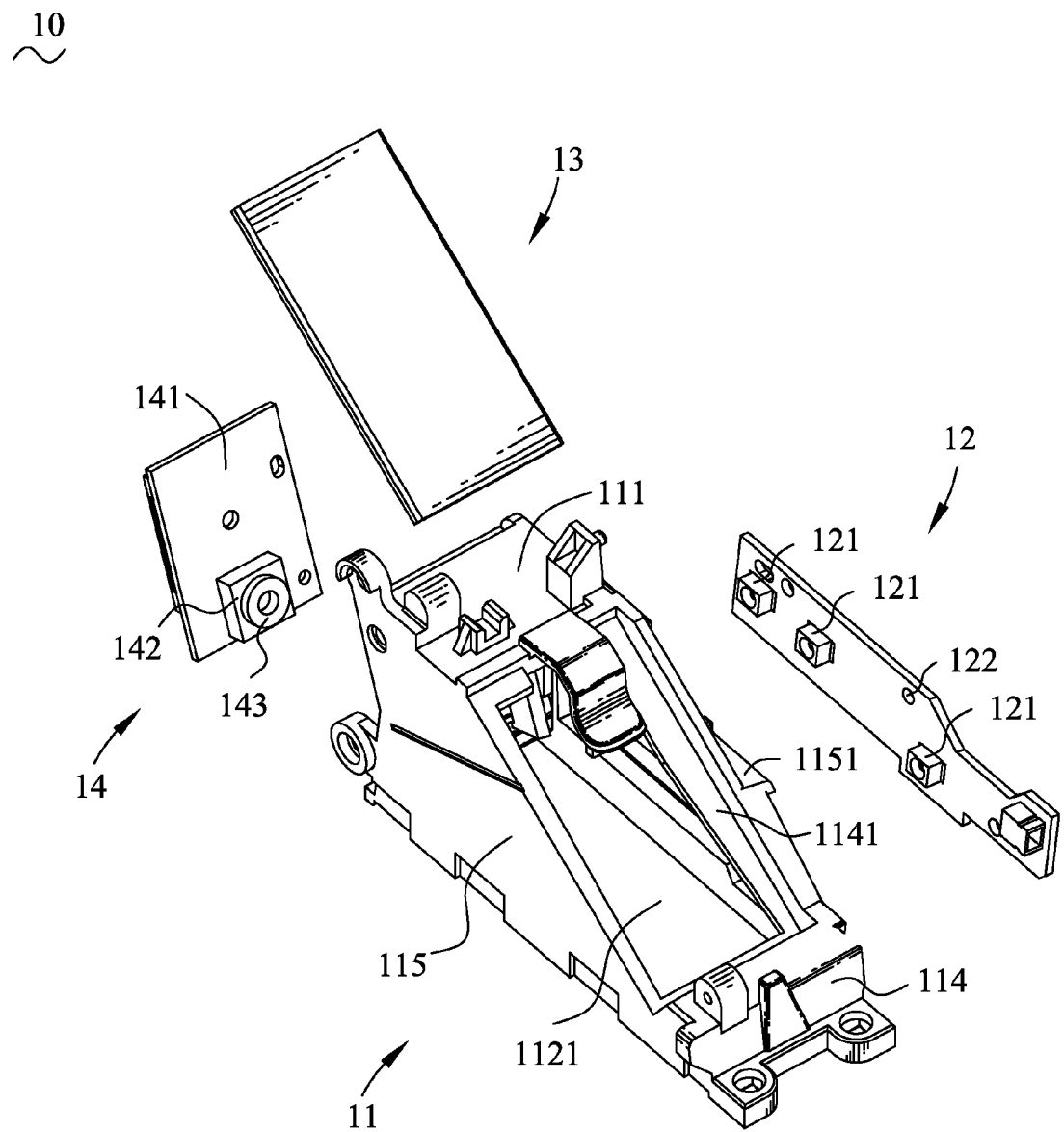
FIG. 4 is another exploded view of the optical scanning assembly of FIG. 2.

Referring to FIG. 2, FIG. 3 and FIG. 4, the housing 11 is of rectangular shape. The housing 11 has a top wall 111, a bottom wall 112, a high end wall 113, a short end wall 114 and two side walls 115. The high end wall 113 and the short end wall 114 are oppositely protruded upward on two ends of the bottom wall 112. A top of the short end wall 114 is spaced below the top wall 111. Two edges of the two side walls 115 which connect with the top wall 111 and the top of the short end wall 114 are defined as slopes 1141. The bottom wall 112 defines a rectangular window 1121 for scanning an original (not shown). Two long sides of the window 1121 are parallel to ones of the bottom wall 112.

Referring to FIG. 1, FIG. 2, FIG. 3 and FIG. 4, the light source circuit board 12 is mounted to an outer side of one of the two side walls 115 of the housing 11 and electrically connected to the Printed Circuit Board assembly 30. The light source circuit board 12 is inclined upward and outward relative to the one of the two side walls 115 at a predetermined angle. An inner side of the light source circuit board 12 is equipped with a plurality of light sources 121. The light sources 121 are exposed through the one of the two side walls 115 for illuminating the inside of the optical scanning assembly 10, the window 1121 and the original.

In detail, a lower part of the outer side of the one of the two side walls 115 protrudes slantwise upward and outward to form a mounting portion 1151. An outer surface of the mounting portion 1151 is concaved inward to form a mounting groove 1152. A through-hole 1153 is opened through an inner sidewall of the mounting groove 1152 and the one of the two side walls 115. The inner sidewall of the mounting groove 1152 protrudes outward to form a plurality of positioning pillars 1154. The light source circuit board 12 defines a plurality of positioning holes 122 corresponding to the positioning pillars 1154 in the mounting groove 1152. The light source circuit board 12 is disposed in the mounting groove 1152. The positioning pillars 1154 are inserted in the positioning holes 122. The light sources 121 of the light source circuit board 12 are located in the through-hole 1153.

In this embodiment, the light source circuit board 12 is inclined at an angle of 6 degrees relative to the one of the two side walls 115. The light sources 121 of the light source circuit board 12 are composed of three LED sources which are transversely arranged and inclined upward at a predetermined angle relative to the window 1121, wherein the distance between the middle one of the LED sources and one of the LED sources which is close to the high end wall 113 is less than the distance between the middle one of the LED sources and another one of the LED sources which is close to the short end wall 114, so that the illumination brightness from the light sources 121 is uniform on the inside of the optical scanning assembly 10, the window 1121 and the original.

Referring to FIG. 1, FIG. 3 and FIG. 4, the reflective member 13 is mounted to the slopes 1141 of the housing 11 and slantwise faces the window 1121. The reflective member 13 receives light from the light sources 121 and reflects the light uniformly on the window 1121.

Referring to FIG. 1, FIG. 2, FIG. 3 and FIG. 4, the image capture module 14 is mounted to the high end wall 113 of the housing 11 and electrically connected to the Printed Circuit Board assembly 30. The reflective member 13 slantwise faces the image capture module 14. The image capture module 14 receives light which is from the original and reflected by the reflective member 13 and then transmits it to the Printed Circuit Board assembly 30, where the Printed Circuit Board assembly 30 converts the original to a digital image.

In detail, the image capture module 14 includes a circuit board 141. An inner side of the circuit board 141 facing the reflective member 13 is equipped with an image sensor 142 and a lens 143 disposed on the image sensor 142. The lens 143 focuses the light from the original on the image sensor 142 by the reflection of the reflective member 13. The image sensor 142 converts the light focused by the lens 143 into voltage signals. The circuit board 141 outputs the voltage signals to the Printed Circuit Board assembly 30 for being converted to the digital image.

Referring to FIG. 1, FIG. 2, FIG. 3 and FIG. 4, in assembly, the light source circuit board 12, the reflective member 13 and the image capture module 14 are mounted to housing 11 of the optical scanning assembly 10. The light source circuit board 12 and the image capture module 14 are electrically connected to the Printed Circuit Board assembly 30. The light sources 121 of the light source circuit board 12 illuminate the inside of the optical scanning assembly 10, the window 1121 and the original. The reflective member 13 receives the light from the light sources 121 and reflects the light uniformly on the window 1121. The image capture module 14 receives the light which is from the original and reflected by the reflective member 13 and then transmits it to the Printed Circuit Board assembly 30, where the Printed Circuit Board assembly 30 converts the original to the digital image.

As described above, the reflective member 13 of the optical scanning assembly 10 is mounted to the slopes 1141 of the housing 11, the light source circuit board 12 is mounted to the outer side of the one of the two side walls 115 of the housing 11 and inclined upward and outward relative to the one of the two side walls 115 at a predetermined angle. So that the wireless scanner achieves a flat optical path configuration, and the illumination brightness is uniform on the window 1121. Furthermore, the wireless scanner will have a small size and a good effect.

What is claimed is:

1. A wireless scanner, comprising:
   a shell;
   a Printed Circuit Board assembly disposed in the shell and controlling all functions and operations of the wireless scanner; and
   an optical scanning assembly disposed in the shell and including
   a housing of rectangular shape, the housing having a top wall, a bottom wall, a high end wall, a short end wall and two side walls, the high end wall and the short end wall being oppositely protruded upward on two ends of the bottom wall, a top of the short end wall being spaced below the top wall, two edges of the two side walls which connect with the top wall and the top of the short end wall being defined as slopes, the bottom wall defining a rectangular window for scanning an original, two long sides of the window being parallel to ones of the bottom wall,
   a light source circuit board mounted to an outer side of one of the two side walls of the housing and electrically connected to the Printed Circuit Board assembly, the light source circuit board being inclined upward and outward relative to the one of the two side walls at a predetermined angle, an inner side of the light source circuit board being equipped with a plurality of light sources, the light sources being exposed through the one of the two side walls for illuminating the inside of the optical scanning assembly, the window and the original,
   a reflective member mounted to the slopes of the housing and slantwise facing the window, the reflective member receiving light from the light sources and reflecting the light uniformly on the window, and
   an image capture module mounted to the high end wall of the housing and electrically connected to the Printed Circuit Board assembly, the reflective member slantwise facing the image capture module, the image capture module receiving light which is from the original and reflected by the reflective member and then transmitting it to the Printed Circuit Board assembly, where the Printed Circuit Board assembly converts the original to a digital image.

2. The wireless scanner as claimed in claim 1, wherein a lower part of the outer side of the one of the two side walls protrudes slantwise upward and outward to form a mounting portion, an outer surface of the mounting portion is concaved inward to form a mounting groove, a through-hole is opened through an inner sidewall of the mounting groove and the one of the two side walls, the light source circuit board is disposed in the mounting groove, the light sources of the light source circuit board are located in the through-hole.

3. The wireless scanner as claimed in claim 2, wherein the inner sidewall of the mounting groove protrudes outward to form a plurality of positioning pillars, the light source circuit board defines a plurality of positioning holes corresponding to the positioning pillars in the mounting groove, the positioning pillars are inserted in the positioning holes.

4. The wireless scanner as claimed in claim 1, wherein the light source circuit board is inclined at an angle of 6 degrees relative to the one of the two side walls.

5. The wireless scanner as claimed in claim 1, wherein the light sources of the light source circuit board are composed of three LED sources which are transversely arranged and inclined upward at a predetermined angle relative to the window, the distance between the middle one of the LED sources and one of the LED sources which is close to the high end wall is less than the distance between the middle one of the LED sources and another one of the LED sources which is close to the short end wall.

6. The wireless scanner as claimed in claim 1, wherein the image capture module includes a circuit board, an inner side of the circuit board facing the reflective member is equipped with an image sensor and a lens disposed on the image sensor, the lens focuses the light from the original on the image sensor by the reflection of the reflective member, the image sensor converts the light focused by the lens into voltage signals, the circuit board outputs the voltage signals to the Printed Circuit Board assembly for being converted to the digital image.

* * * * *